April 27, 1943. W. C. BARNES ET AL 2,317,719
METHOD AND APPARATUS FOR DETECTING FLAWS IN MAGNETIZABLE BODIES
Original Filed June 8, 1935 5 Sheets-Sheet 4

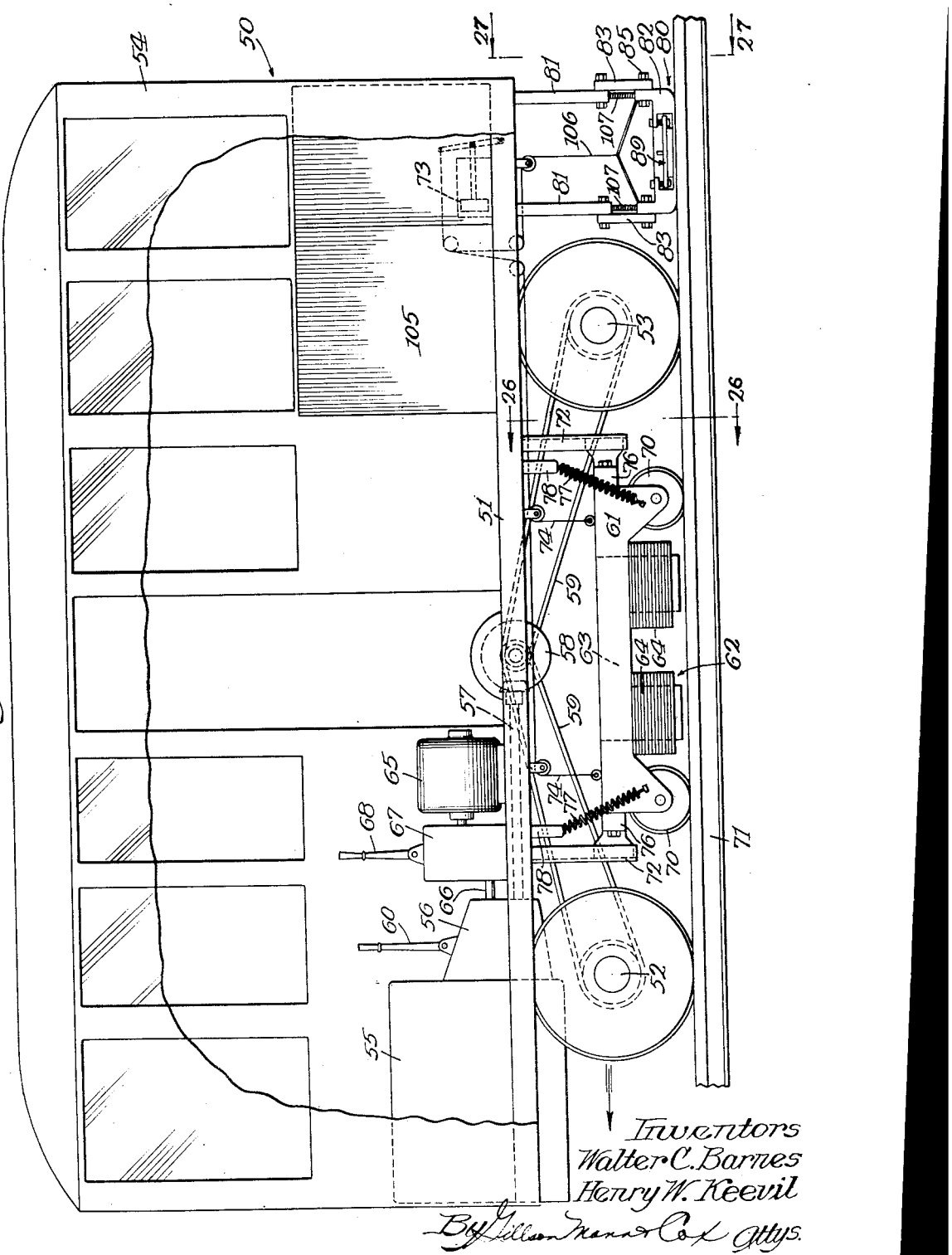

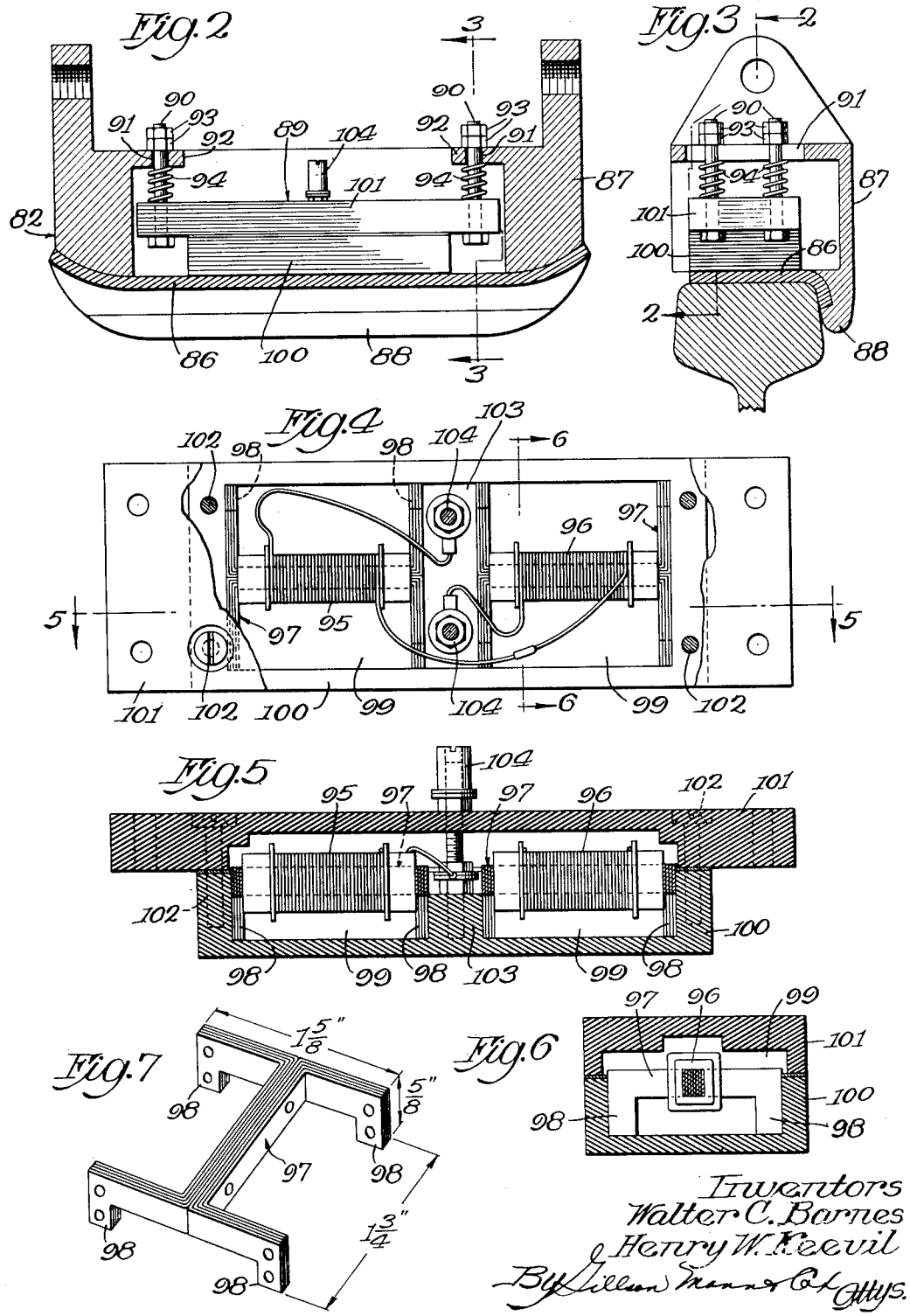

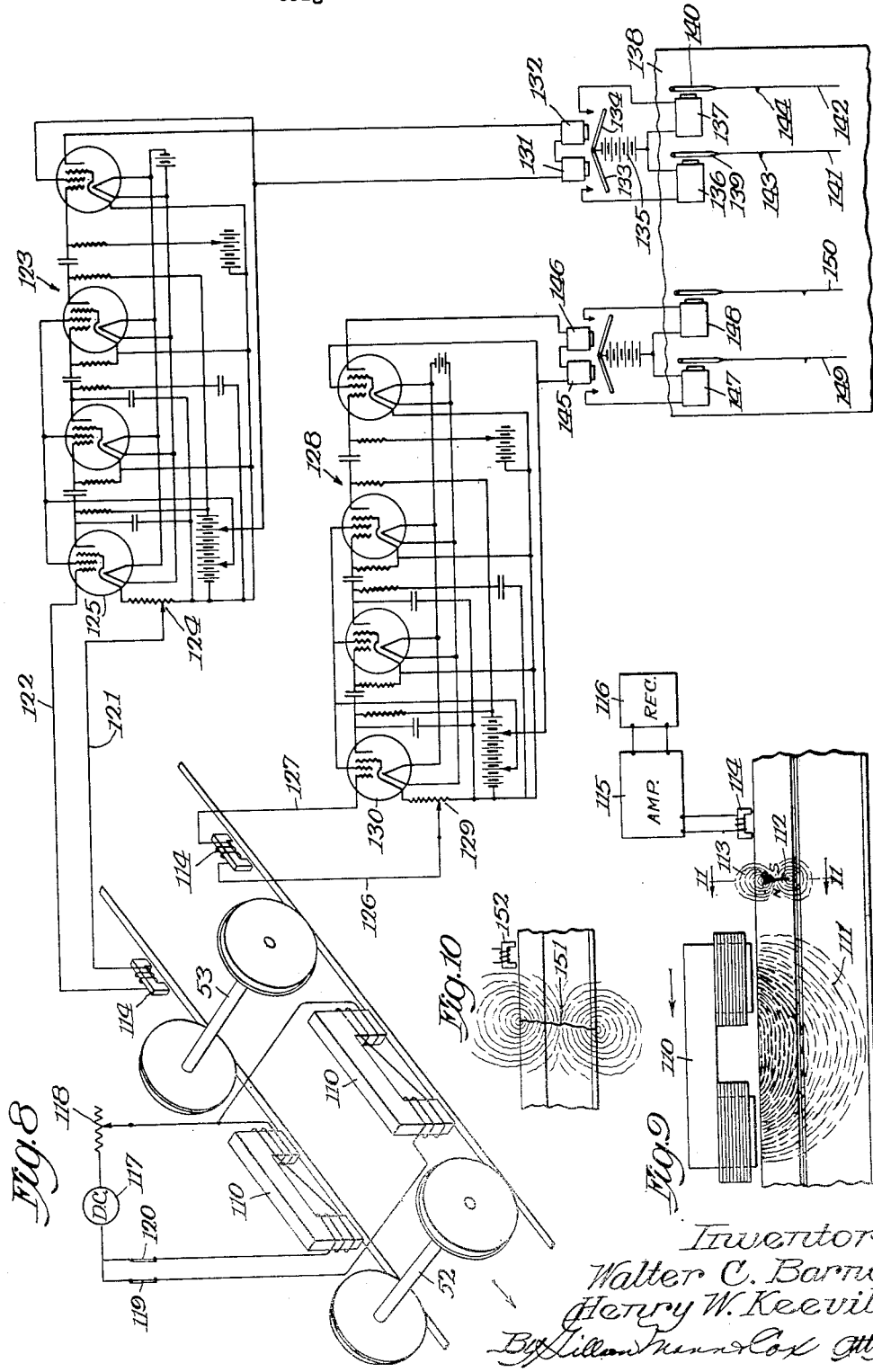

Inventors
Walter C. Barnes
Henry W. Keevil
By Gilson Menn & Cox Attys

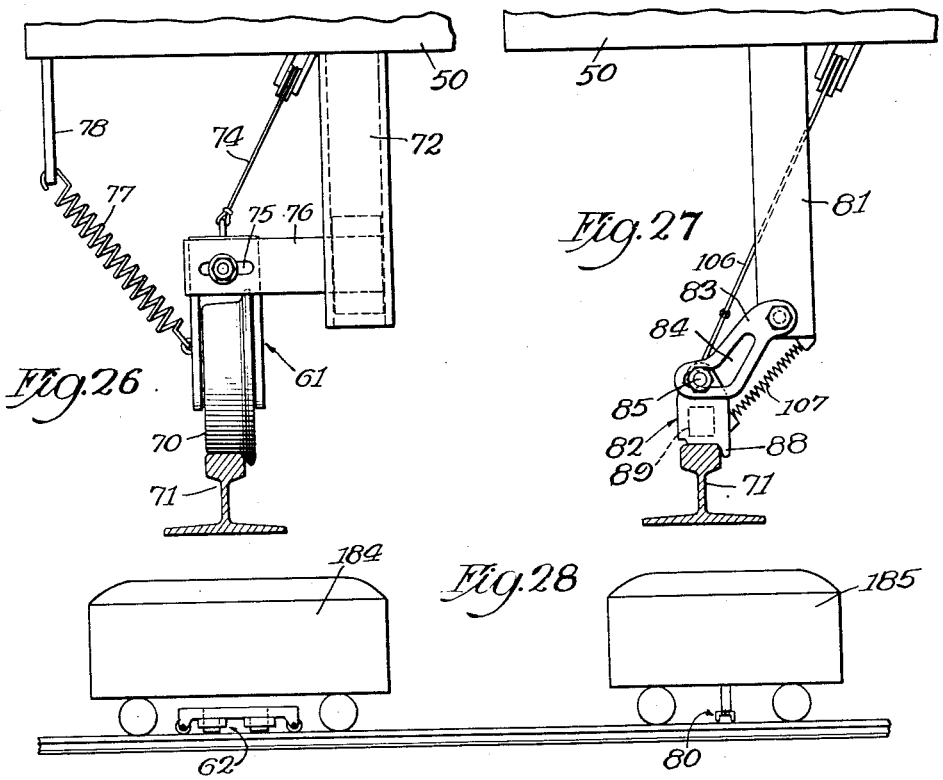

Patented Apr. 27, 1943

2,317,719

UNITED STATES PATENT OFFICE 2,317,719

METHOD AND APPARATUS FOR DETECTING FLAWS IN MAGNETIZABLE BODIES

Walter C. Barnes, Lake Bluff, and Henry W. Keevil, Highland Park, Ill.

Original application June 8, 1935, Serial No. 25,586. Divided and this application April 17, 1940, Serial No. 330,210

9 Claims. (Cl. 175—183)

This application is a division of our copending application, Serial Number 25,586, filed June 8, 1935.

In Sperry Reissue Patent No. 18,555, the following statement appears (page 1, lines 12-35)

"A method of detecting * * * fissures has been heretofore proposed wherein the magnetic properties of the rail is utilized. According to this prior method the rail is placed in a strong magnetic field which is moved relatively to the rail, and means are employed to detect variations in the field produced by the varying permeability of the rail from the point to point. The theory was that a hidden fissure would cause a variation in the number of lines of force passing through the object which could be detected by the resultant variation in the field surrounding the object, but the method failed because variations in such field were produced not only by fissures but often more pronouncedly by other variations in the physical characteristics of the rail, such as hard spots, soft spots, hammer blows, gag marks, etc. Such a method, therefore, failed of its purpose, for it was impossible to distinguish between fissure indications and those due to other causes which do not seriously weaken the rail."

Others have regarded magnetic testing with the same distrust. For example, Sanford and Kouwenhoven in writing on the subject of "Location of Flaws in Rifle Barrel Steel by Magnetic Analysis" (Proceedings of the American Society for Testing Materials (1919) vol. 19, part II, page 81) state, at page 92:

"The greatest difficulty in this line of investigation lies in the interpretation of the results. This is due to the fact that there are many causes which may produce magnetic inhomogeneity and it is difficult to differentiate between them."

Several years later, Mr. Sanford, in an article entitled "Nondestructive Testing of Wire Hoisting Rope by Magnetic Analysis" (published in Technologic Papers of the Bureau of Standards, No. 315, April 16, 1926) makes the following statement (pages 517-518)

"* * * Slight variations in stress conditions along the length of a specimen, therefore, often give rise to irregularities in the records of magnetic exploration tests which can not be distinguished from those resulting from flaws. * * *

"* * * There are as yet so many sources of uncertainty, however, that there seems to be no immediate prospect of the development of a magnetic method for the inspection of wire rope of a sufficient degree of reliability to warrant its use on a commercial basis."

We have discovered that the uncertainty in magnetic testing has been due, not to the lack of correlation between magnetic properties and mechanical properties, but to the fact that the detection of flaws has invariably been attempted in the presence of the energizing field. That is the reason that the results obtained were neither reliable nor capable of exact interpretation, for certain variables were unavoidably present which greatly affected the final result. For example, variations in the energizing field, slight changes in the air gap between the electromagnet and body under test, slight differences in hardness and reluctance of different portions of the test piece, were responsible for much of the difficulty encountered in magnetic testing as it has heretofore been attempted.

According to our invention, relatively large variations in the strength of the energizing flux, the extent of the air gap, the hardness of the material, and the like, have no effect on the record obtained, these sources of uncertainty being entirely eliminated by using residual magnetism for indicating inhomogeneities in the test material.

Residual magnetism has been used by some investigators for locating surface cracks or imperfections in metallic bodies, the cracks or defects being indicated by the characteristic pattern taken by finely divided magnetic particles, such as iron filings or the like, sprinkled over the surface of the body. This method has never been successful in locating deep internal defects and the method, of course, is entirely unsuited for the progressive testing of rails in track.

In our method, we first set up a relatively strong magnetic field in a portion of the body under test to cause it to be uniformly magnetized in a given direction and to overcome any magnetic condition that may have previously existed in that portion of the body.

We then remove the energizing field and search the space around the body for traces of residual magnetism, because we have found that cracks, fissures and such like cause a peculiar magnetic condition to be set up that can be detected externally by suitable means.

The more important objects of our invention, therefore, are to provide a method and apparatus for detecting flaws in magnetizable bodies utilizing the residual magnetic condition in the vicinity of flaws to locate the flaws; to disassociate the detection apparatus from the energizing field so that the detection apparatus is entirely independent of changes in energizing force, hardness of material, and other factors which heretofore have caused uncertainty in the interpretation of records obtained by conventional methods of magnetic analysis; to adapt our method of testing to locating flaws in track; to provide a test car equipped with apparatus for using our method, and which is capable of continuously testing the track over which the car operates while the car is moving at a speed of several miles an hour, or more; and to accomplish these results with apparatus that is substantially less expensive, but more reliable and accurate than apparatus on cars now in use.

The present application relates particularly to a modified form of the invention claimed broadly in Ser. No. 212,121 which is to issue as a patent on the same date as this application.

Further and other objects and advantages will become apparent as the disclosure proceeds and the description is read in conjunction with the accompanying drawings, in which Fig. 1 is a diagrammatic, side elevational view of a test car, with one form of apparatus for carrying out our invention;

Fig. 2 is a longitudinal, sectional view through the support casting for the detector shoe, the section being taken on the line 2—2 of Fig. 3;

Fig. 3 is a section taken on the line 3—3 of Fig. 2;

Fig. 4 is a plan view of a detector unit employing two longitudinally arranged detector coils connected in opposition, the top cover being broken away to expose the coils;

Fig. 5 is a longitudinal, sectional view taken on the line 5—5 of Fig. 4;

Fig. 6 is a transverse, sectional view taken on the line 6—6 of Fig 4;

Fig. 7 is a perspective view of the core for one of the coils shown in Figs. 4 and 5;

Fig. 8 is a diagrammatic, perspective view illustrating one embodiment of the invention;

Fig. 9 is a view that will be used in explaining the theory which is thought to account for the advantageous results obtainable with our method;

Fig. 10 illustrates the magnetic condition at a broken rail;

Fig. 26 is a sectional view taken on the line 26—26 of Fig. 1;

Fig. 27 is a sectional view taken on the line 27—27 of Fig. 1; and

Figure 11:
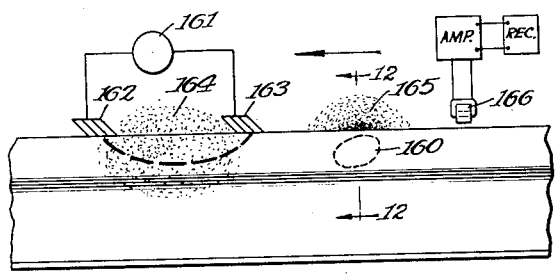
Fig. 11 is a diagrammatic view showing the manner in which an electrical current may be passed longitudinally through the body under test for setting up the magnetic field, this arrangement being particularly advantageous for locating vertical split heads.

Fig. 28 indicates the manner in which two cars may be used for testing track, one carrying the means for setting up the magnetic field in the rails, and the other carrying the detection equipment.

The embodiments of the invention shown in the drawings and hereinafter described have been chosen for the purpose of making the disclosure required by sec. 4888 of the Revised Statutes, but it will be understood that the scope of the invention is not limited to the specific embodiments shown and described.

In the preferred form of the invention, a large electromagnet passes uni-directional magnetic flux through a portion of the body under test and the body is then explored for traces of residual magnetism by an induction coil suitably connected to amplifying and recording apparatus. This form of the invention is illustrated somewhat diagrammatically in Figs. 1–6 inclusive and will first be described.

The flaw detecting mechanism is mounted in a detector car, indicated at 50, comprising an underframe 51 mounted on wheeled axles 52 and 53 and supporting a house body 54, the forward end of which is adapted to house the necessary equipment for operating the car, the rear end being reserved for apparatus that is used in conjunction with the flaw detector mechanism.

The car is preferably powered by a governor controlled internal combustion engine 55 of approximately 60 H. P. capacity which transmits power through a clutch and transmission 56, drive shaft 57, gear box 58 and chain belts 59 to the axles 52 and 53 of the car. The lever 60 indicates an operating means for the clutch and transmission 56, the latter including a reverse gear for running the car backward.

The speed of the engine 55 and the gear ratio of first gear in the transmission 56 are such that the car may be driven forward at some constant predetermined speed, for example five miles per hour for making test runs.

Mounted between the axles 52 and 53 is a carriage 61 adapted to support a relatively large electromagnet 62 consisting of an iron core 63 and coils 64 that are energized by a generator 65 (preferably 110 volt, 2 k. w. direct current), driven by suitable means, as for example, from a power take-off 66 associated with the transmission 56. A clutch 67 operated by a lever 68 enables the generator to be disconnected from its drive whenever desired.

The source of power for the car and for driving the generator 65 is so much a matter of choice that further description is deemed unnecessary.

The electromagnet carriage 61 is equipped with flanged wheels 70 adapted to ride upon the track 71 with the wheel flanges in engagement with the gauge side of the rail. When the car is not being used for detection purposes, it is desirable to lift the electromagnet carriage from the rail, and this is accomplished by mounting the carriage in channel guides 72 which depend from the car underframe 51. The carriage is lifted by a piston 73 operated by compressed air and connected by cables 74 to the electromagnet carriage. There is a lost motion connection 75 (Fig. 26) between the carriage 61 and the arms 76 which travel in the guides 72 so that when the carriage is lifted by the cable 74, it moves toward the guides 72. The purpose of this arrangement is to cause the carriage to be lowered in such a manner that the flanges of the wheels 70 will always engage the gauge side of the rail instead of riding on the rail. Tension springs 77 attached at one end to the carriage and at the other end to lugs 78 hold the wheel flanges against the gauge side of the rail when the carriage has been lowered, the angularity of each spring, and its tension, being such that it only comes into play after the carriage has substantially reached its operative position.

The detector unit generally designated 80 is mounted beneath the rear end of the car and like the electromagnet carriage, is adapted to be lifted from the rail when the flaw detection apparatus is not being operated. The detection unit is pivotally supported from arms 81 extending downwardly from the car underframe, the connection between the detector carriage 82 and the arms being through links 83 equipped with cam slots 84, adapted to loosely receive carriage studs 85, as best shown in Figs. 1 and 27.

The carriage 82 is preferably made of brass and is equipped with a replaceable manganese steel runner 86 (Figs. 2 and 3). The body 87 of the carriage has a flange 88 which overhangs the gauge side of the rail and fixes the position of the detector shoe with respect to the rail head. The central portion of the carriage 82 is recessed to receive the detector shoe 89 (Fig. 2) which may be supported from the carriage by carriage bolts 90 which loosely pass through slots 91 in overhanging walls 92 of the carriage. Nuts 93 screw on to the projecting ends of the bolts 90 and cooperate with springs 94 interposed between the walls 92 and the detector shoe 89 for supporting the latter in proper position over the rail head. This particular mounting has the advantage that it enables the detector shoe to be adjusted both vertically and laterally with respect to the rail head.

When the detecting unit consists of inductive means, it is preferable to employ two longitudinally arranged coils 95 and 96 placed end to end and connected in opposition (that is so that any longitudinal flux, or component of flux that simultaneously acts on both coils will produce E. M. F's that oppose each other and consequently balance out). Each coil is mounted on an H-shaped core 97 (Fig. 7), the four legs of which are provided with downwardly extending feet 98. The cores are preferably laminated as best shown in Fig. 7 in order to better conduct longitudinal components of flux through the coils. The coils and their cores are mounted in recesses 99 provided in the detector shoe, the latter being preferably of Bakelite or some other insulating material and comprising a base 100 and cover 101, the latter being removably secured to the base by countersunk machine screws 102. The partition 103 between the recesses 99 receives the binding posts 104, as best shown in Figs. 4 and 5 to which the terminals of the coils 95 and 96 are connected. Suitable leads connect the binding posts 104 with amplifying apparatus conveniently mounted in a compartment 105 at the rear of the car.

The carriage 82 is lifted to inoperative position by a cable 106 attached at one end to the carriage and at the other end to the piston 73. When the carriage is raised, the cam slot 84 causes the carriage to move to the right (Fig. 27) so that when it is thereafter lowered, the flange 88 will be sure to fall inside of the gauge edge of the rail. Relatively light compression springs 107 extending between the arms 81 and the carriage 82 have their angularity and strength such that when the carriage has been substantially lowered to operative position, the springs will force the flange 88 of the carriage against the gauge side of the rail.

Referring now to Figs. 8–10 inclusive, an attempt will be made to explain the theory which is believed to underlie the present invention although all theoretical discussions in this specification are to be construed not as defining a mode of operation, but merely as a possible explanation of certain physical, electrical or magnetic phenomena known to exist.

In the latter part of 1918 and early part of 1919, considerable work was done on magnetic analysis by Charles W. Burrows and Frank P. Fahy, at the Bureau of Standards, this work being reported in the Proceedings of American Society for Testing Materials, 1919, vol. 19, part II, pages 5–49. One of the methods discussed by Messrs. Burrows and Fahy was called the magnetic leakage method, and it consisted essentially of measuring directly the variation in magnetic flux along the length of the rail. The authors, however, admit that it is difficult to produce a uniform magnetizing force along any considerable length of a rail, and the results of their experiments clearly show that hard and soft spots in the rail have a very substantial effect upon the record that is made.

All of the Burrows and Fahy work was based on the detection of magnetic leakage in the presence of the energizing field, and it was because of this basis that the method was not commercially successful, for obviously variations in the magnetizing force, the air gap and the homogeneity of the metal produced substantial indications that were not distinguishable from those produced by flaws.

In our method, the detection of flaws is done after the energizing field has been collapsed, or has been moved to another portion of the body under test. The indication that is produced by this method is caused not by leakage of the energizing flux, but by a condition of residual magnetism that is set up at discontinuities, or flaws, in the rail.

Let us now refer to Fig. 9 to see what happens when a longitudinally arranged electromagnet is passed over a transverse fissure and is followed in its course by a longitudinally arranged induction coil. Assuming that the magnet 110 shown in Fig. 9 is energized substantially to saturation by uni-directional flux, we may assume that the flux will travel through the rail somewhat in the manner indicated by the flux lines 111. If, while the electromagnet is being moved along the rail, it passes a transverse fissure, such as indicated at 112, the longitudinal flux will cause one face of the fissure to become a north pole and the other face a south pole, and the striking phenomenon is that this condition persists even after the electromagnet 110 has moved beyond the fissure. This residual magnetic condition is manifested on the exterior of the rail by flux lines extending outside of the rail head somewhat as indicated by the flux lines 113. These flux lines lie essentially in planes which include the center line of the rail and hence when a longitudinally arranged induction coil 114 is passed through the field, a current will be induced in the coil which may be suitably amplified at 115 and recorded at 116 to indicate the presence of the fissure.

Theoretically, it is unnecessary to use two detector coils connected in opposition because the detection unit is not operating in the presence of the energizing field, but it is preferable in order to balance out stray fields which might otherwise produce an indication.

In Fig. 8, there is shown diagrammatically an application of the method to a detector car. The wheeled axles 52 and 53 of the detector car are shown with direct current electromagnets 110 between the axles and longitudinal pickup coils 114 in rear of the rear axle. A direct current generator is indicated at 117 for energizing the electromagnets 110, the electromagnets being connected in parallel and controlled by a rheostat 118. Switches 119 and 120 are provided for separately controlling the parallel circuits.

The right rail pickup 114 is connected by leads 121 and 122 to an amplifier 123, preferably condenser coupled and having a sensitivity control 124 in the grid circuit of the first tube 125. The left rail pickup 114 is connected by conductors 126 and 127 to a similar amplifier 128 which also has a sensitivity control 129 in the grid circuit of the first tube 130. The amplifier circuit will be understood by those skilled in the art and further description is deemed unnecessary.

The output of the amplifier 123 is in series with a pair of coils 131 and 132 which are adapted to raise front contact armatures 133 and 134, respectively, when sufficient current passes through the coils. The armatures 133 and 134 are in a local circuit which includes a battery 135 and pen relays 136 and 137. A record strip 138 is moved continuously by suitable means beneath the pen relays, either in proportion to car speed, or at some predetermined speed which may be varied to suit conditions of testing. The pens 139 and 140 associated with the pen relays 136 and 137 cause record lines 141 and 142 to be transcribed on the record sheet. Preferably, one of the relays in the amplifier output circuit has a lower pickup value than the other so that a relatively weak current through the circuit will operate only one of the relays (for example coil 131 with its armature 133), whereas a somewhat stronger current will operate both relays. The jogs 143 and 144 in the record lines, therefore, having been produced (in this illustration) simultaneously by the same current impulse, indicate that the detecting unit has traversed a relatively strong residual magnetic field.

In a similar manner, the output from the amplifier 128 associated with the left rail pickup will energize coils 145 and 146, and operate pen relay 147, or pen relays 147 and 148, according to the strength of the amplifier output current, thereby indicating by the record lines 149 and 150 the induction of a current in the left rail pickup 114.

In Fig. 10, there is illustrated diagrammatically the residual magnetic field that exists at a broken rail, and it is obvious that the break 151, after it has been traversed by a magnetic flux will leave a residual field somewhat as shown in this figure. Consequently when a detector coil, such as 152 passes through the field, the broken rail will readily be detected. As a matter of fact, a broken rail will produce an exceptionally strong indication whereas in the electro-inductive method of testing shown in Sperry Reissue 18,555, considerable difficulty was experienced in locating broken rails, as is evidenced by Drake 1,907,756, which dealt with that particular problem.

The combination of a longitudinally arranged electromagnet and a longitudinal coil is particularly suitable for detecting transverse fissures and it will later appear that other combinations are more efficient in locating other types of fissures.

There are other ways of setting up a magnetic flux in a rail and locating residual magnetic fields by induction means, and some of these are shown in Figs. 11–23 inclusive.

In Fig. 11, a combination is shown that is particularly suitable for locating a vertical split head, as indicated at 160. Here, a relatively strong, direct current is passed through the rail, the source of current being indicated at 161, and the brushes for applying the current to the rail being indicated at 162 and 163. The current in passing through the portion of the rail between the brushes 162 and 163 sets up a relatively strong magnetic flux that is transverse of the rail head, this flux being indicated diagrammatically at 164. This flux is inseparable from the current which produces it and only exists between the brushes 162 and 163. Behind the brush 163, there is no magnetic field except where the flux has traversed a fissure such for example as shown at 160 where the faces of the fissure have become magnetized and a residual field exists as indicated at 165. The lines of flux in this field are transverse of the rail head and a transverse induction coil, such as indicated at 166 is best suited for detecting the presence of the residual field.

Figures 12, 13:
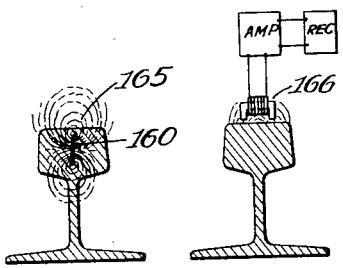
Fig. 12 is a sectional view taken on the line 12—12 of Fig. 11.
Fig. 13 shows the type of coil that is most suitable for use in detecting fissures of the type shown in Figs. 11 and 12.
Figure 14:
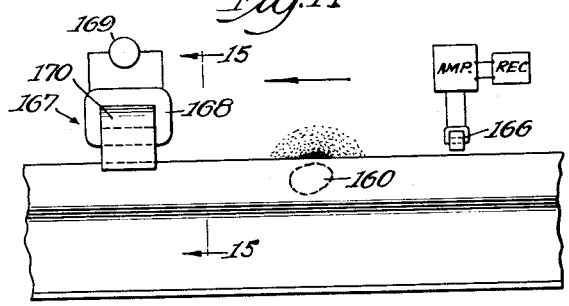
Fig. 14 shows another method that is particularly suitable for locating split heads.
Figure 15:
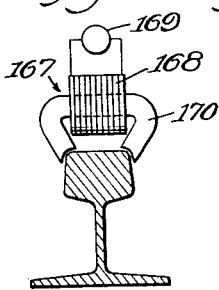
Fig. 15 is a sectional view taken on the line 15—15 of Fig. 14.

Fig. 12 shows the vertical split head in cross section and the magnetic field associated with it, and Fig. 13 shows the transverse coil 166 in its relation to the magnetic flux.

Instead of passing an electrical current through the rail, as shown in Fig. 11 in order to produce a transverse flux, the flux may be produced directly by a direct current electromagnet 167, (Figs. 14 and 15) the coil 168 of which is energized by a suitable source 169. The residual field at the split head 160 is the same as shown in Figs. 11 and 12 and the same pickup 166 may be used. The core 170 of the electromagnet is preferably U-shaped with the poles turned inwardly in order to apply the flux transversely of the rail without interference from switch frogs, joint bars, and the like.

Figure 16:
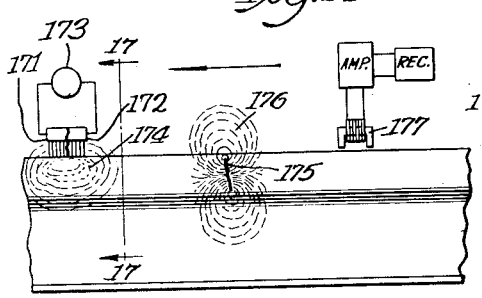
Fig. 16 illustrates an arrangement in which current is passed transversely through the rail head, and a longitudinal exploring coil is utilized for locating the fissure.
Figure 17:
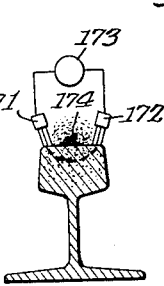
Fig. 17 is a sectional view taken on the line 17—17 of Fig. 16.
Figure 18:
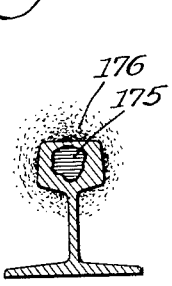
Fig. 18 is a sectional view through the fissure shown in Fig. 16 indicating the distribution of flux.
Figure 19:
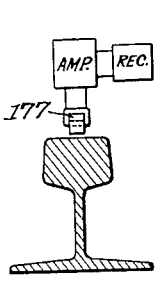
Fig. 19 is an end view of the detector coil shown in Fig. 16.

In Fig. 16, there is shown an alternative for the arrangement shown in Figs. 1, 8 and 9. In this case, the longitudinal flux is set up by an electrical current that is passed transversely through the rail by brushes 171 and 172 (Figs. 16 and 17) energized by a suitable source of direct current 173. The current produces a flux 174 longitudinally of the rail, and this flux is particularly suitable for producing a residual magnetic condition at transverse fissures, such as indicated at 175. Since the lines of force in the residual magnetic flux 176 at the fissure 175 lie in planes which include the longitudinal axis of the rail, it is preferable to employ a longitudinal exploring coil 177 in order to obtain the greatest possible indication from the flux at the fissure.

Figure 20:
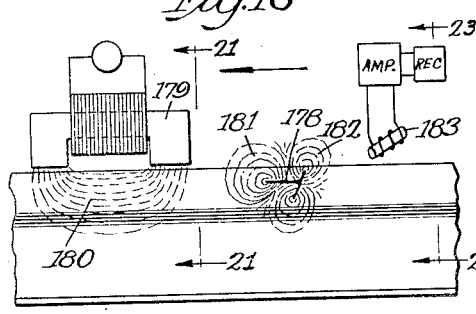
Fig. 20 shows an arrangement that is particularly suitable for locating compound fissures.
Figure 21:
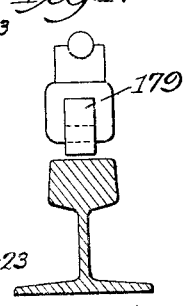
Fig. 21 is a sectional view taken on the line 21—21 of Fig. 20.
Figure 22:
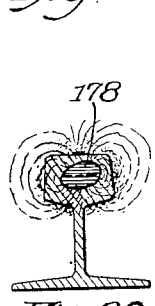
Fig. 22 illustrates the probably flux distribution in the region of the compound fissure.

In Fig. 20, a compound fissure is indicated at 178, that is a fissure which has a horizontal and transverse component. The magnetization of this type of fissure may be effected by a longitudinally placed direct current electromagnet, such as indicated at 179, which sets up a field 180 through the rail. It will be noticed that this field 180 necessarily has a vertical, as well as a horizontal component, and the former is particularly effective in magnetizing the horizontal portion of the fissure 178 and the longitudinal component is particularly effective in magnetizing the vertical portion.

Figure 23:
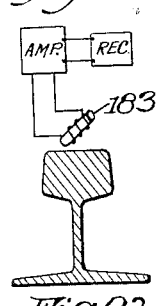
Fig. 23 is a sectional view taken on the line 23—23 of Fig. 20.

Since the residual field 181 set up by the horizontal portion of the fissure has relatively strong longitudinal, transverse and vertical components, and since the field 182 set up in the region of the transverse portion of the fissure has relatively strong longitudinal and vertical components, it is desirable to employ an induction coil 183 which is placed with its axis at an angle to all three principal axes of the rail, as best shown in Figs. 20 and 23. In this position, the coil will always cut some lines of force and an indication of the defect in the rail is, therefore, assured. In this arrangement, a second coil connected in series opposition to the first coil and making different angles with respect to the three principal axes of the rail would be desirable.

Figure 24:
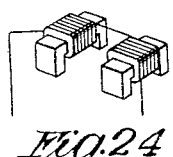
Fig. 24 is a view showing the manner in which transverse coils when used in pairs are preferably connected together.
Figure 25:
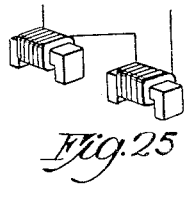
Fig. 25 shows the manner in which longitudinal coils when used in pairs are preferably connected together.

Figs. 24 and 25 merely show that when two transverse coils are used, they are preferably placed side by side and connected in the manner shown, that is with the coils connected in series but wound in opposite directions. When two longitudinal coils are used, they are placed in tandem and connected in series but oppositely wound.

Although Fig. 1 shows the energizing electromagnet and the detector unit mounted on the same car, it is obvious that the magnetization of the rail may be effected by one car as indicated at 184, and the detection of flaws by another car, as indicated at 185. (Fig. 28)

The energizing flux produced by the electromagnet, or other source of flux, should be sufficient, preferably, to wipe out all residual magnetism previously in the rail, and set up a substantially uni-directional flux through the rail. To do this, the electromagnet, if that is the source of flux, should have a cross section that is sufficiently large in relation to the flux set up by the energizing coils 64 (Fig. 1) that the core 63 does not become saturated for if it does, the amount of stray field is considerably increased, and the detection unit may be affected.

We claim:

1. In a car for locating flaws in track, means for setting up a uni-directional, transverse, magnetic flux through a limited portion of track, and a detector unit on the car located in rear of said means and outside of its field of operation whereby when the car is moved forward the detector unit passes progressively over a portion of the track that had been previously magnetized by said means, said detector means including an induction coil positioned with its longitudinal axis transverse of the rail, whereby it is responsive to the residual magnetism set up by the transverse magnetizing means at internal and cracked-out vertical split heads.

2. The method of detecting an internal flaw in a ferro-magnetic body having one of the flaw faces so positioned that a line normal thereto lies in a vertical plane which is at an angle to the longitudinal axis of the body, which consists in subjecting a portion of the body to externally applied forces causing transverse lines of flux in the body and thereby establishing a residual magnetic field in the vicinity of said flaw, removing all of said forces from said portion of the body, and subsequently not simultaneously locating said field by a magnetically responsive device moved along the body and constructed and arranged to detect the presence of magnetic lines of force having a component transverse to the body.

3. The method of detecting flaws in a ferromagnetic body which consists in subjecting the body to the energizing force which, when removed, leaves a residual magnetic field in the vicinity of said flaws, then locating said field by moving a flux responsive device along said body to cause the device to produce an indication when it traverses said field, said device including a detector coil having its longitudinal axis at a substantial angle to the longitudinal axis of the body.

4. The method of detecting flaws in a ferromagnetic body which consists in subjecting the body to the magnetic field set up by an electrical current progressively introduced between spaced points in the body whereby a residual magnetic field is established in the vicinity of the flaw and then locating said field by moving a flux responsive device along the body in a path that will cause the device to produce an indication when it traverses said field, said device including an induction coil having its axis substantially normal to the direction of current flow.

5. The method of detecting flaws in a ferromagnetic rail which consists in subjecting the rail to the magnetic field set up by an electrical current progressively introduced between longitudinally spaced points in the rail whereby a residual magnetic field is established in the vicinity of the flaw and then locating said field by moving a flux responsive device along the rail in a path that will cause the device to produce an indication when it traverses said field, said device including an induction coil having its axis substantially normal to the direction of current flow.

6. The method of detecting flaws in a ferromagnetic rail which consists in subjecting the rail to the magnetic field set up by an electrical current progressively introduced between longitudinally spaced points in the rail whereby a residual magnetic field is established in the vicinity of the flaw and then locating said field by moving a flux responsive device along the rail in a path that will cause the device to produce an indication when it traverses said field, said device including an induction coil having its axis at a substantial angle to the longitudinal axis of the rail.

7. The method of detecting flaws in a ferromagnetic rail which consists in subjecting the rail to the magnetic field set up by an electrical current progressively introduced between longitudinally spaced points in the rail whereby a residual magnetic field is established in the vicinity of the flaw and then locating said field by moving a flux responsive device responsive to flux transverse of the rail along the rail in a path that will cause the device to produce an indication when it traverses said field.

8. The method of detecting flaws in a ferromagnetic body which consists in subjecting the body to the magnetic field set up by an electrical current progressively introduced between spaced points on the body whereby a residual magnetic field is established in the vicinity of the flaw and then locating said field by relatively moving a flux responsive device responsive to flux transverse to the direction of current flow along the body in a path that will cause the device to produce an indication when it traverses said field.

9. The method of detecting flaws in a ferromagnetic body which consists in subjecting the body to the energizing force which, when removed, leaves a residual magnetic field in the vicinity of said flaws, then locating said field by moving a flux responsive device along said body to cause the device to produce an indication when it traverses said field, said device including a detector coil having its longitudinal axis at a substantial angle to all three major axes of the body.

WALTER C. BARNES.
HENRY W. KEEVIL.